US012548428B1

(12) United States Patent
McIntire et al.

(10) Patent No.: US 12,548,428 B1
(45) Date of Patent: Feb. 10, 2026

(54) SECURITY CONTAINER STATUS REMINDER AND ALERTING MODULE

(71) Applicant: The Government of the United States, as represented by the Secretary of the Air Force, Wright-Patterson AFB, OH (US)

(72) Inventors: John McIntire, Dayton, OH (US); Matthew Srnoyachki, Moraine, OH (US); Matthew Sunday, California, KY (US); Thomas Mitchell, Dayton, OH (US); Joseph Althaus, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 143 days.

(21) Appl. No.: 18/433,811

(22) Filed: Feb. 6, 2024

Related U.S. Application Data

(60) Provisional application No. 63/486,326, filed on Feb. 22, 2023.

(51) Int. Cl.
*G08B 21/24* (2006.01)
*G08B 3/00* (2006.01)

(52) U.S. Cl.
CPC ............... *G08B 21/24* (2013.01); *G08B 3/00* (2013.01)

(58) Field of Classification Search
CPC .................................. G08B 21/24; G08B 3/00
USPC .......................................................... 340/540
See application file for complete search history.

(56) References Cited

U.S. PATENT DOCUMENTS

| | | | | |
|---|---|---|---|---|
| 4,453,390 | A | 6/1984 | Moritz et al. | |
| 4,772,877 | A | 9/1988 | Rice, Jr. et al. | |
| 5,072,211 | A | 12/1991 | Clement | |
| 6,065,408 | A | 5/2000 | Tillim et al. | |
| 6,921,990 | B1 | 7/2005 | Higgins | |
| 9,663,968 | B2 | 5/2017 | Witterstaetter et al. | |
| 10,889,418 | B2 * | 1/2021 | McBride | G07C 9/00944 |
| 2005/0280500 | A1 * | 12/2005 | Miller | G07C 9/00912 340/5.55 |
| 2010/0176950 | A1 * | 7/2010 | Bartholf | G07F 9/026 340/572.1 |
| 2015/0148023 | A1 | 5/2015 | Chuang | |
| 2015/0259956 | A1 | 9/2015 | Frederick et al. | |
| 2019/0172331 | A1 * | 6/2019 | Hall | G06K 7/10445 |

(Continued)

*Primary Examiner* — Jack K Wang
(74) *Attorney, Agent, or Firm* — AFMCLO/JAZ; Richard M. Mescher

(57) ABSTRACT

A monitor for a security container includes a first monitor portion for attachment to one of a closure or a housing of the security container. The first monitor portion includes a sensor, an audible alarm, and a "spin-confirm" push-button for a user to confirm that a lock dial of the security container was spun to lock the security container closure shut. The audible alarm activates when the sensor indicates that the security container closure is open after a defined period of time. The audible alarm deactivates only when the sensor indicates that the security container closure is closed, and the "spin-confirm" push-button is activated. A "snooze" push-button can be provided for the user to temporarily pause or alter the audible alarm to work with the security container unsecured.

19 Claims, 9 Drawing Sheets

(56) References Cited

U.S. PATENT DOCUMENTS

| | | | | |
|---|---|---|---|---|
| 2021/0301583 | A1 * | 9/2021 | Moyer | E05B 39/00 |
| 2023/0042058 | A1 * | 2/2023 | N'Guessan | E05B 1/0084 |

* cited by examiner

| Mode | State | Door | Bolt | Functionality | Display | Alerts | Next | Notes |
|---|---|---|---|---|---|---|---|---|
| A | Safe Secure | Closed | Locked | Button press shows remaining battery level for 5 sec. Opening door will trigger open/closed magnetic sensor, awakening the module. | "Safe Secure" status; Last opened date/time log (2 most recent records); Battery % (if button press). | None | A->B | Low-power "sleep mode; may want to alert user to change batteries soon if below 10% |
| B | Door Open | Open | Not Locked | Audio alerts encourage user to shut the door when in an open state. | "Close Door" | Audible triple-beeps on timer with reduced alerting intervals (60s, 45s, 30s, 15s, then continuous). | B-> C | Encourages/reminds user to shut door; alerts passerby if left unattended |
| C | Spin or Snooze | Closed | Not Locked | Immediate prompt for user decision; Either secure the safe (and press Confirm Dial Spin) or press Snooze for more working time. | "Confirm Dial Spin" (top button) or "snooze/Add Working Time" (bottom button) | Continuous audio beeping and continuous flashing (alternating between the two LEDs) until one of the two buttons pressed. | C-->A or C-->D | Continuous alerting until decision made. Encourages immediate decision. Reminder to spin dial to secure with user confirmation. Option to continue working. Snooze button press adds 15 min. and starts countdown |
| D | Count down | Closed | Not Locked | Countdown timer runs until next prominent alert with heartbeat alerts. Snooze time can be added in +15 min. increments, or Spin Confirm can be pressed. | "Confirm Dial Spin" or "Snooze/Add Working Time. Running Countdown Timer; Last Opened Date/Time Log (2 most recent records) | Regular "heartbeat audio alerts (double beep) at 2 min. intervals. | If countdown timer reaches zero, then D→C. If spin confirm button pressed, D→A. | Provides regular heartbeat reminders that safe is unsecure; these require no action on user to silence. When countdown timer to zero, prompted to secure safe or add time. |

FIG. 4

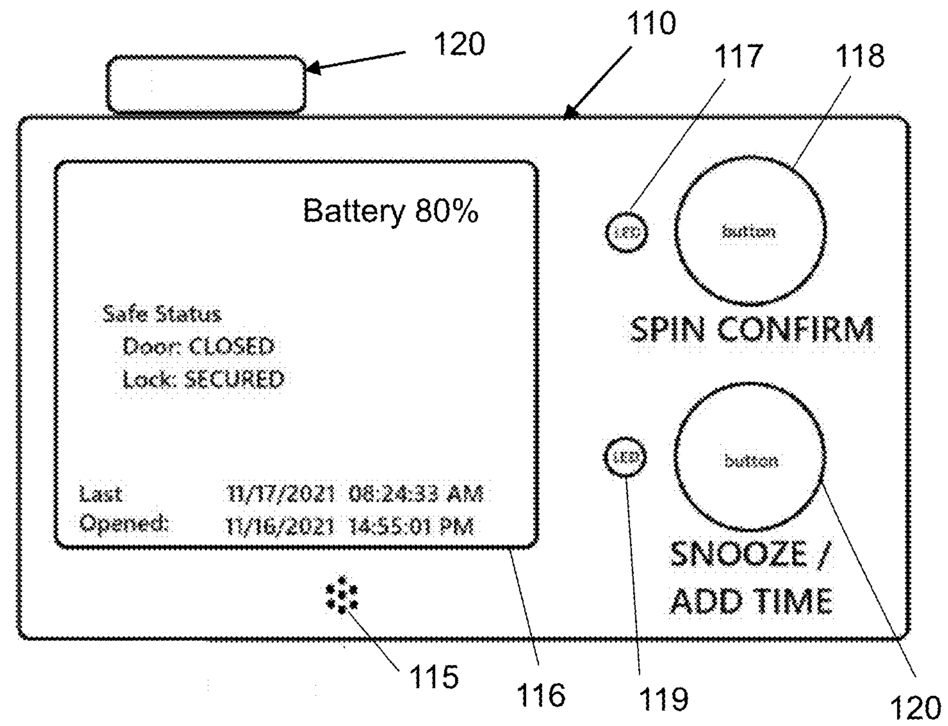
FIG. 6A "SECURE" MODE
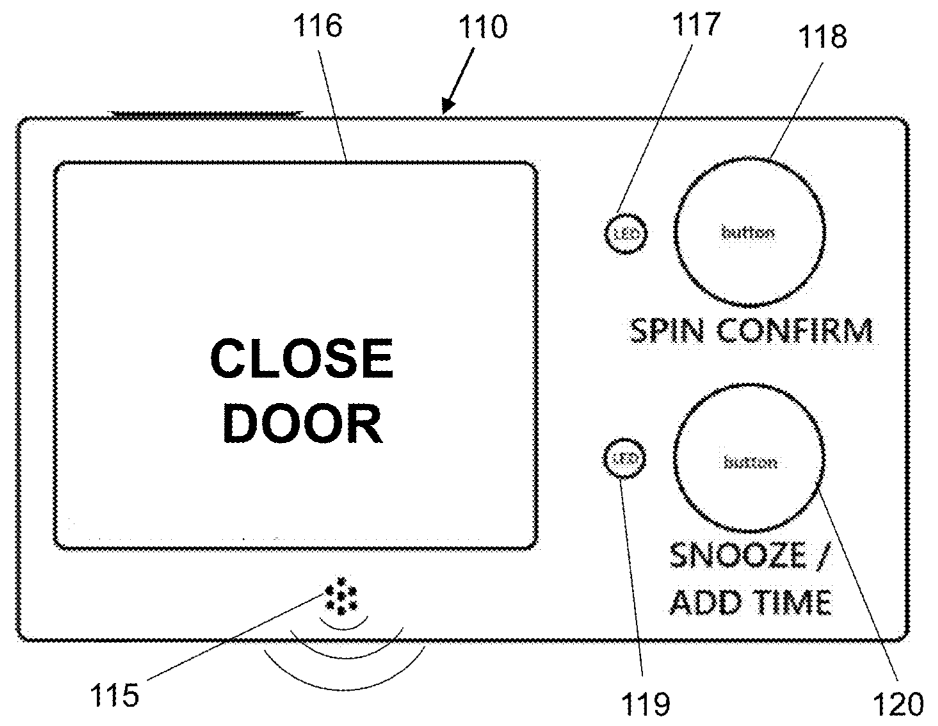
FIG. 6B "DOOR OPEN" MODE

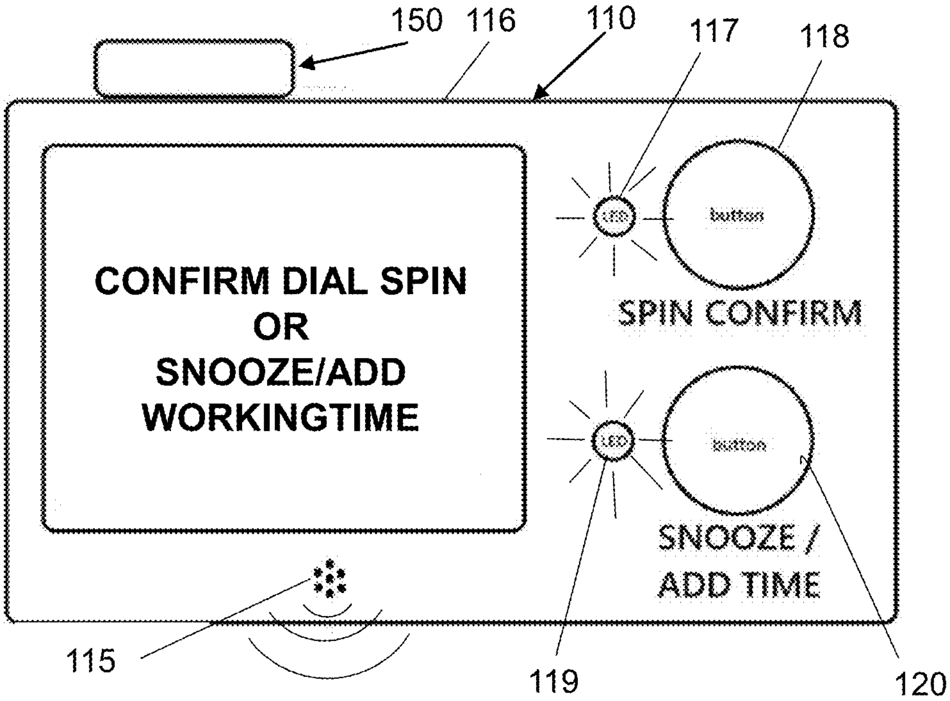
FIG. 6C "SPIN OR SNOOZE" MODE
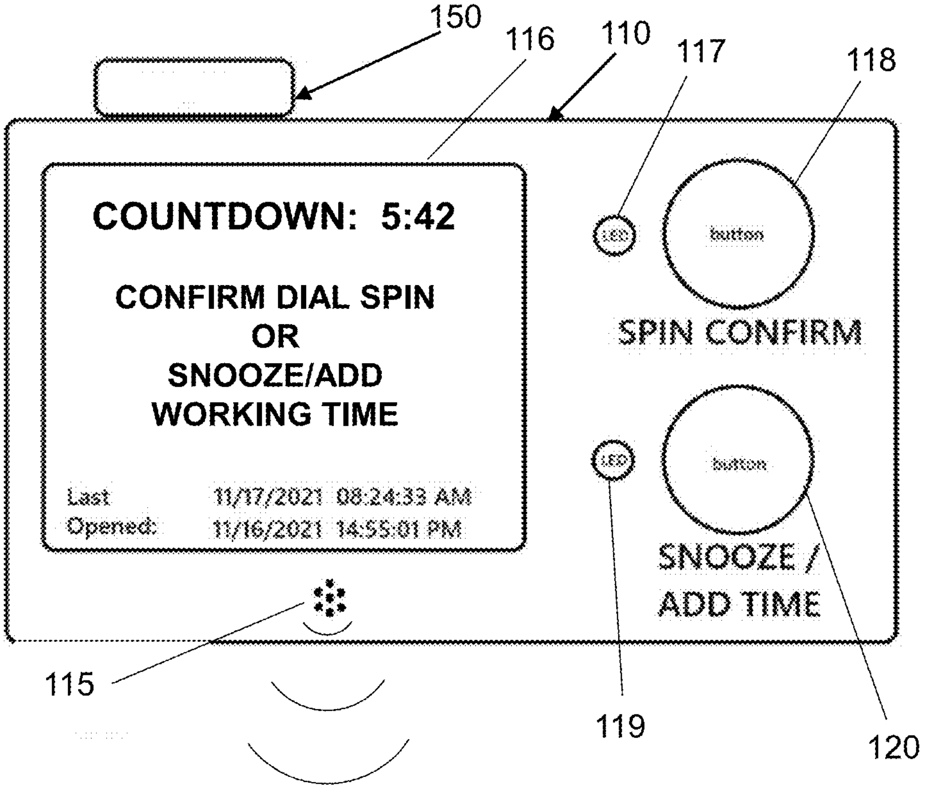
FIG. 6D "COUNTDOWN" MODE

SECURITY CONTAINER STATUS REMINDER AND ALERTING MODULE

Pursuant to 37 C.F.R. § 1.78(a)(4), this application claims the benefit of and priority to prior filed Provisional Application Ser. No. 63/486,326, filed Feb. 22, 2023, which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to security of safes, vaults, and other security containers and, more particularly, to such security containers that are located within security environments.

BACKGROUND OF THE INVENTION

A human error with regard to protecting sensitive or classified information involves accidentally leaving vault doors, secure space exterior doors, safes, and related security container doors or drawers open or unsecured. This security incident can occur across the federal government and military. Most often, a door or drawer may be shut as intended, but the additional step of manually spinning the lock dial to engage the bolting mechanism is still required in essentially all Government Services Administration (GSA) approved locks. Other times, an open container door or drawer is accidentally left unattended when it should not be, due to forgetfulness, distraction, or miscommunication on who is responsible for securing it.

Costs, regulations, and security concerns limit the ability for the U.S. Government or military to retrofit, retroactively modify, or install brand new hardware on thousands upon thousands of safes and other security containers with "smart" lock/safe hardware that sense the status of door position (open/closed) and bolt position (locked/unlocked), and then display it to users or even networking this information to centralized locations for broader security awareness. New hardware integrated into such locking systems would also necessitate GSA requirements modifications, re-certifications, and extensive robustness and security testing.

Accordingly, there is a continuing need to remediate these human errors without expensive or laborious retrofits/modifications to existing locking systems, while complying with existing relevant security container and secure space regulations (e.g., GSA).

SUMMARY OF THE INVENTION

The present invention overcomes the foregoing problems and other shortcomings, drawbacks, and challenges of eliminating or reducing human errors with regard to leaving vault doors, secure space exterior doors, safe doors and drawers, and related security container doors or drawers open or unsecured in a cost-effective manner while complying with existing U.S. Government regulations for security containers and secure spaces. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a monitor for a security container comprises a first monitor portion configured for attachment to one of a closure of the security container closure and a housing of the security container The first monitor portion comprises a sensor for indicating whether a closure of the security container is in an open position or a closed position, an audible alarm, a first input device configured for activation by a user to confirm that the spinning dial was spun to lock the combination lock with the closure in the closed position, and a fastener for operably and removably securing the first monitor portion to the security container. The audible alarm activates when the sensor of the first monitor indicates that the closure of the security container is in the open position after a defined period of time. The audible alarm is only deactivated when the sensor indicates that the closure of the security container is in the closed position, and the user input device is activated to confirm that a spinning dial was spun to lock a combination lock with the closure in the closed position.

According to another embodiment of the present invention, a monitor for a security container comprises a first monitor portion configured for attachment to one of a closure for the security container and a housing of the security container. The first monitor portion comprises a sensor for indicating whether a closure of the security container is in an open position or a closed position, an audible alarm, a first input device configured for activation by a user when the audible alarm is activated to temporarily pause or alter the audible alarm for a defined period of time, and a fastener for operably and removably securing the first monitor portion to the security container. The audible alarm activates when the sensor of the first monitor assembly indicates the closure of the security container is in the open position after a defined period of time.

According to yet another embodiment of the present invention, monitor for a security container comprises a first monitor portion configured for attachment to one of a closure of the security container and a housing of the security container. The first monitor portion comprises a sensor, an audible alarm, a clock for providing a current date and time, a data logger, and a fastener for operably and removably securing the first monitor portion to the security container. The audible alarm activates when the sensor of the first monitor assembly indicates that the closure of the security container is in the open position after a defined period of time. The data logger of the first monitor portion is configured to log the date and time of at least the last two instances when the sensor of the first monitor assembly indicates the closure of the security container is in the open position.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 4 is a table showing operating modes of the alerting and reminder monitor of FIGS. 1 to 3.

FIG. 6A is a diagrammatic view of the alerting and reminder monitor of FIGS. 1 to 5 during a first or "Secure" mode.

FIG. 6B is a diagrammatic view of the alerting and reminder monitor of FIGS. 1 to 5 during a second or "Door Open" mode.

FIG. 6C is a diagrammatic view of the alerting and reminder monitor of FIGS. 1 to 5 during a third or "Spin or Snooze" mode.

FIG. 6D is a diagrammatic view of the alerting and reminder monitor of FIGS. 1 to 5 during a fourth or "Countdown" mode.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1A:
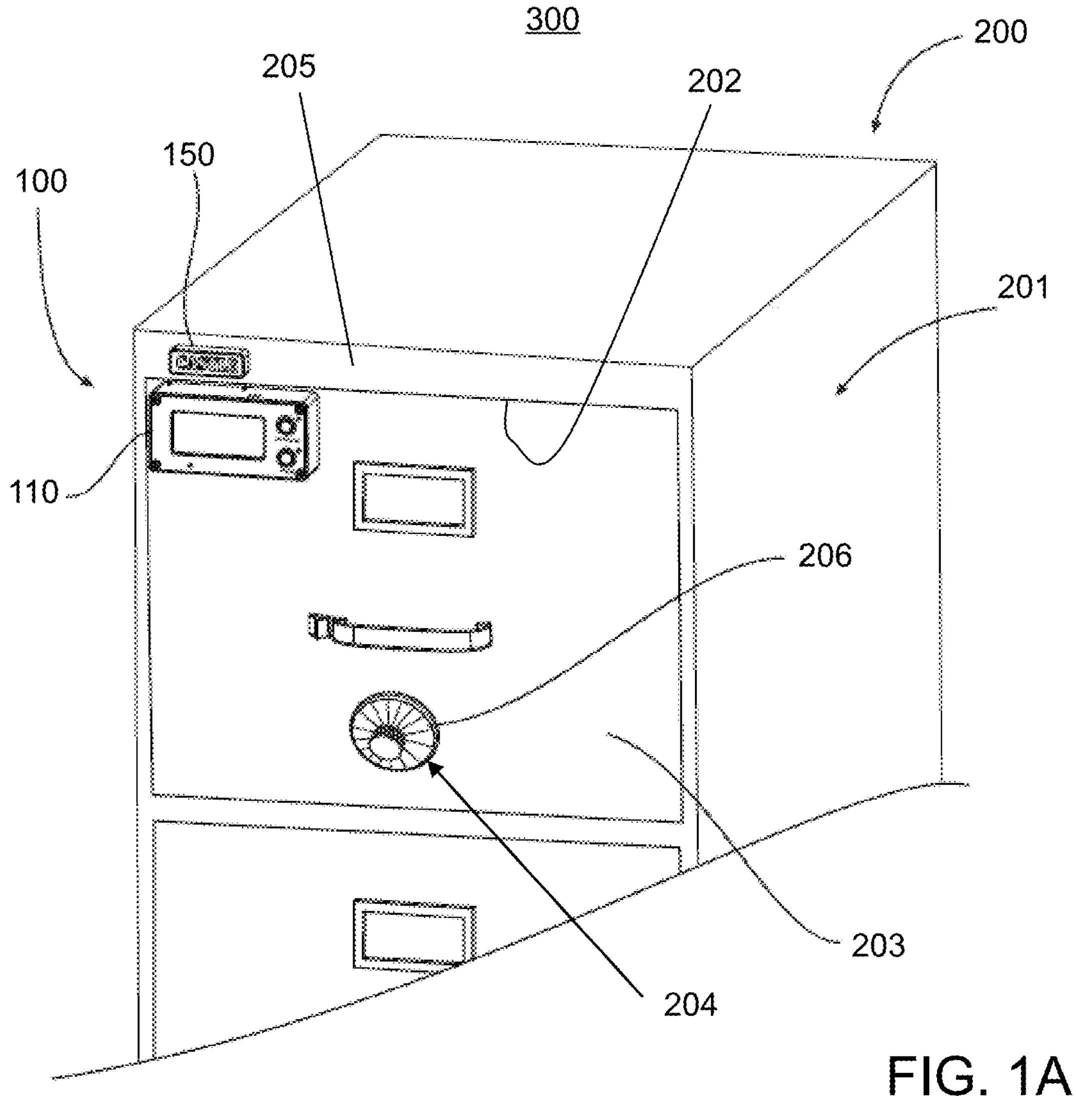
FIG. 1A is fragmented perspective view of an alerting and reminder monitor operably secured to a filing-cabinet type security container according to a first embodiment of the present invention.

FIG. 1A illustrates a first exemplary embodiment of the present invention wherein an alerting and reminder monitor or status module 100 (including a first or primary module component or portion 110 and a separate second or secondary module component or portion 150) is operably and removably attached to a security container 200. Attached in this manner, the first module component 110, the second module component 150, and the security container 200 operate together to form an alerting and reminder system. It is noted that in a second exemplary embodiment (best seen in FIG. 1B), the separate second or secondary module component or portion 150 is eliminated as described in more detail hereinafter. In this specification and the claims, the term "security container" means a container, room, or building utilizing at least one lock and other controls to protect against unauthorized access to items and/or information stored therein such as, for example but not limited to, a safe, a safe room, a safe building, a vault, a vault-like room, a vault-like building, a security cabinet, a security filing-cabinet, and the like. The security container 200 can be of any suitable type such as, for example but not limited to, all Government Services Administration (GSA) approved security containers 200. GSA-approved security containers are tested and qualified to meet the requirements of the Information Security Oversight Office (ISOO) Notice 2014-02 for the Procurement of Security Equipment dated Apr. 4, 2014. The illustrated security container 200 is a GSA-approved Class-5 or Class-6 filing cabinet (meeting Federal Specification AA-F-358F (6 Jul. 1971) and/or each later version thereof) but can alternatively be any other suitable type of security container such as, for example, but not limited to, GSA-approved Class-5W weapons containers (meeting Federal Specification AA-F-358 (6 Jul. 1971) and/or each later version thereof), GSA-approved Class-5 or Class-6 general purpose containers (meeting Federal Specification AA-F-363D (1 Jun. 2001) and/or each subsequent version thereof), GSA-approved Class-5 map and plan containers (meeting Federal Specification AA-F-363D (1 Jun. 2001) and/or each subsequent version thereof), and the like.

The illustrated security container 200 includes an enclosure or housing 201 forming an interior space for storing items secured within the security container 200, at least one opening 202 for selectively providing access to the secured items within the security container 200, at least one closure 203 selectively movable between a closed position to prevent access to the secured items within the security container 200 and an open position to permit access to the secured items within the security container 200, and at least one lock 204 for selectively preventing movement of the at least one closure 203 out of the closed position to prevent access to the to the secured items within the security container 200.

The illustrated housing 201 is generally rectangular shaped and includes a front frame 205 forming the at least one opening 202. It is noted that the housing 201 can alternatively have any other suitable shape. The illustrated at least one opening 202 is in the form of separate rectangular-shaped upper and lower openings 202A, 202B. It is noted that the openings 202A, 202B can alternatively have any other suitable shape, any other suitable configuration, and/or any other suitable quantity. The illustrated at least one closure 203 is in the form of upper and lower drawers 203A, 203B each for cooperating with one of the upper and lower openings 202A, 202B. The illustrated upper and lower drawers 203A, 203B are separately slidable into and out of the housing 202 through the openings 202A, 202B one above the other between the closed and open positions. In the closed position, access to the secured items located with the interior of the drawer 203A, 203B is blocked by the housing 201 and a front panel of the drawer 203A, 203B which is sized and shaped to closely close the cooperating one of the openings 202A, 202B (as seen in FIG. 1A). In the open position, access to the secured items within the interior of the drawer 203A, 203B is available through the open top of the drawer 203A, 203B. It is noted that the drawers 203A, 203B can alternatively have any other suitable shape, any other suitable configuration, and/or any other suitable quantity. It is also noted that the at least one closure 203 can alternatively be of any other suitable type such as, for example but not limited to, at least one door or the like. The illustrated at least one lock 204 is a single lock located on the upper drawer 203A and is configured to prevent the opening of both of the upper and lower drawers 201, 201A when locked and permits the opening of either or both of the upper and lower drawers 203A, 203B when unlocked. It is noted that alternatively each of the upper and lower drawers 203A, 203B can have its own separate lock 204.

The illustrated lock 204 is a dial-based electro-mechanical lock which is preferably a GSA approved lock. The lock 204 includes a dial 206 located on the outside of the drawer 203A. When "locked", the lock 204 prevents both of the upper and lower drawers 203A, 203B from being opened. When "unlocked", the lock 204 allows either or both of the upper and lower drawers 203A, 203B to be opened. To unlock the lock 204, the dial 206 is manually rotated to a predetermined sequence of symbols, usually numbers. The predetermined sequence of symbols is often referred to as the "combination." The rotating dial 206 interacts with a microcontroller of an interior locking mechanism having a bolt. The secret "combination" of symbols is stored in the microcontroller. When an operator correctly rotates the dial 206 over the combination, the microcontroller actuates the locking mechanism to move the bolt from a locking position to an unlocking position. Electrical power for the lock 204 may be provided in any suitable manner such as, for example but not limited to, a battery, a tiny electric generator set in operation by spinning of the dial 206, or the like. To lock the lock 204, while the doors 203A, 203B are closed, the dial 206 is manually rotated to a lock position and the microcontroller actuates the locking mechanism to move the bolt from the unlocking position to the locking position. It is noted that the lock 204 can alternatively have any other suitable configuration or be of any other suitable type.

In the first exemplary embodiment shown in FIG. 1A, the illustrated alerting and reminder monitor 100 includes a first or primary module component or portion 110 and a separate second or secondary module component or portion 150 where each is operably and removably secured to the outside of the security container 200. The illustrated first monitor portion 110 is attached to the outside of the upper drawer 203A and the second monitor portion 150 is attached to the outer face of the housing front frame 205 such that it is juxtaposed the first monitor portion 110 as described in more detail hereinafter.

Figure 1B:
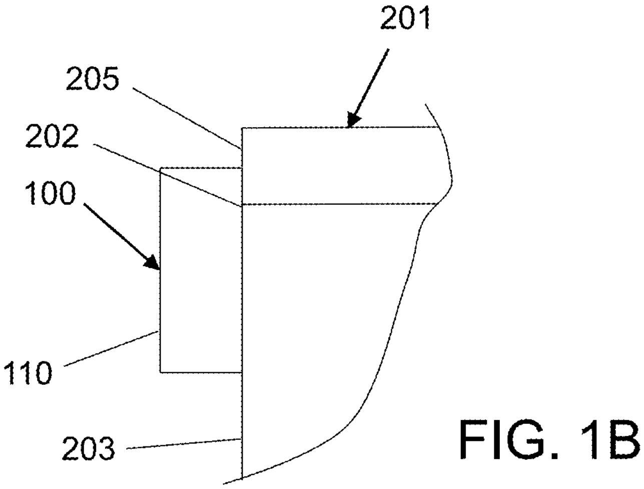
FIG. 1B is fragmented diagrammatic view of an alerting and reminder monitor operably secured to a filing-cabinet type security container according to a second embodiment of the present invention.
Figure 2A:
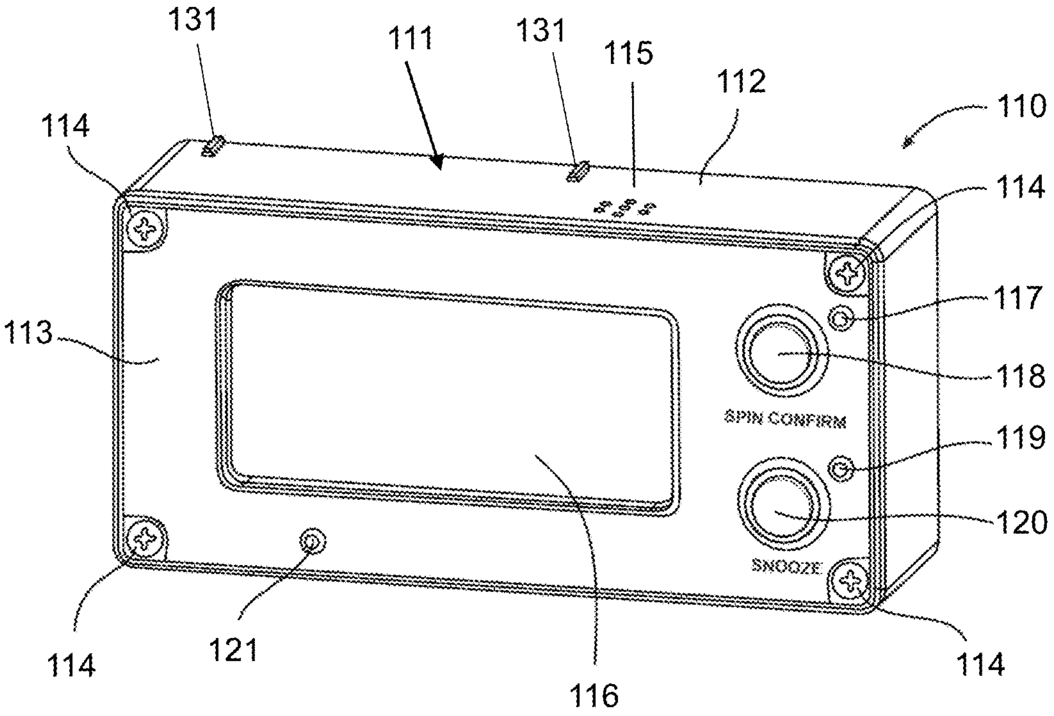
FIG. 2A is a perspective view of a first monitor portion of the alerting and reminder monitor of FIG. 1A but removed from the security container.
Figure 2B:
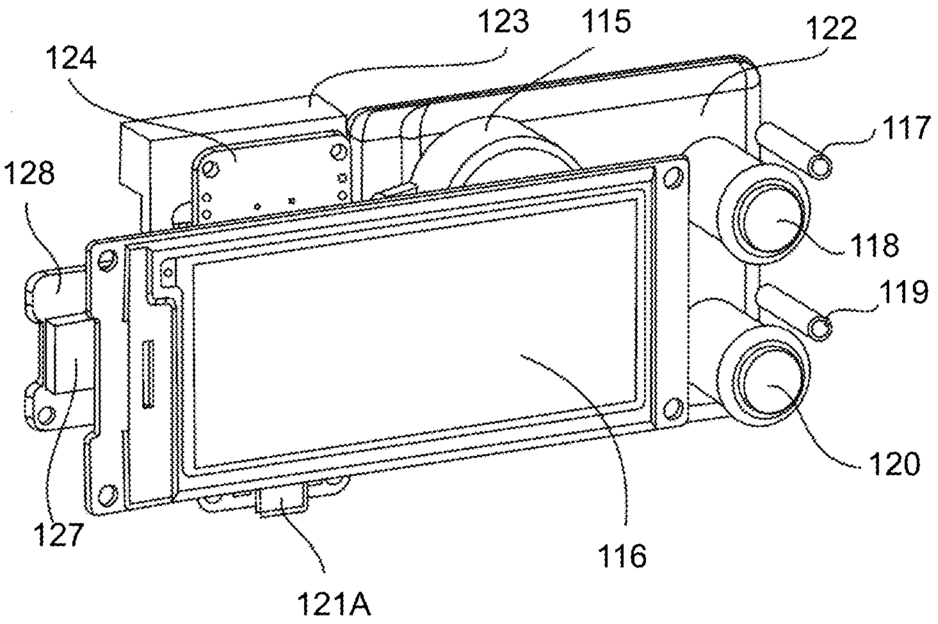
FIG. 2B is a perspective view of the first monitor portion of FIG. 2A with portions of the first monitor portion removed to expose internal parts of the first monitor portion.
Figure 2C:
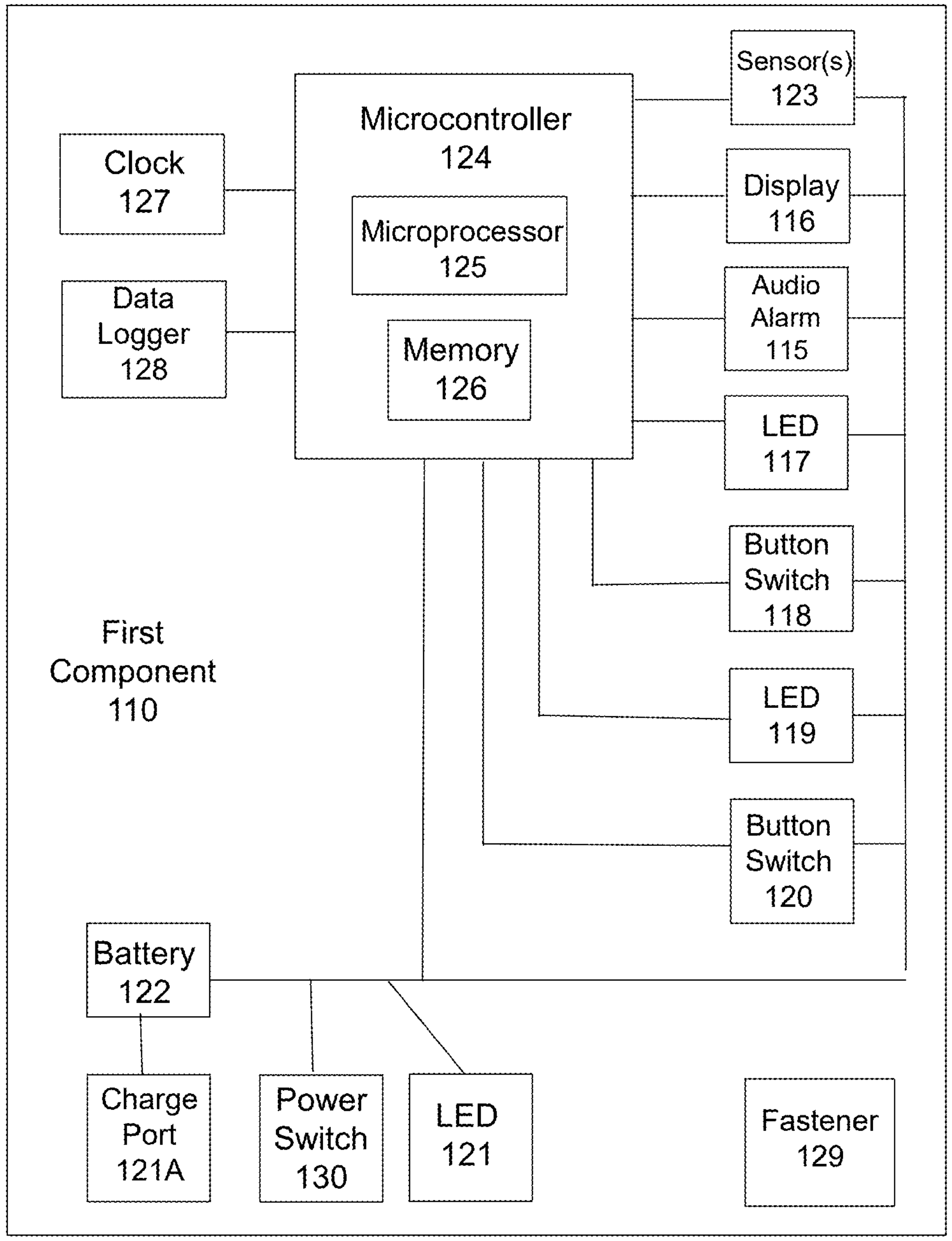
FIG. 2C is a block diagram of the first monitor portion of FIGS. 2A and 2B.
Figure 2D:
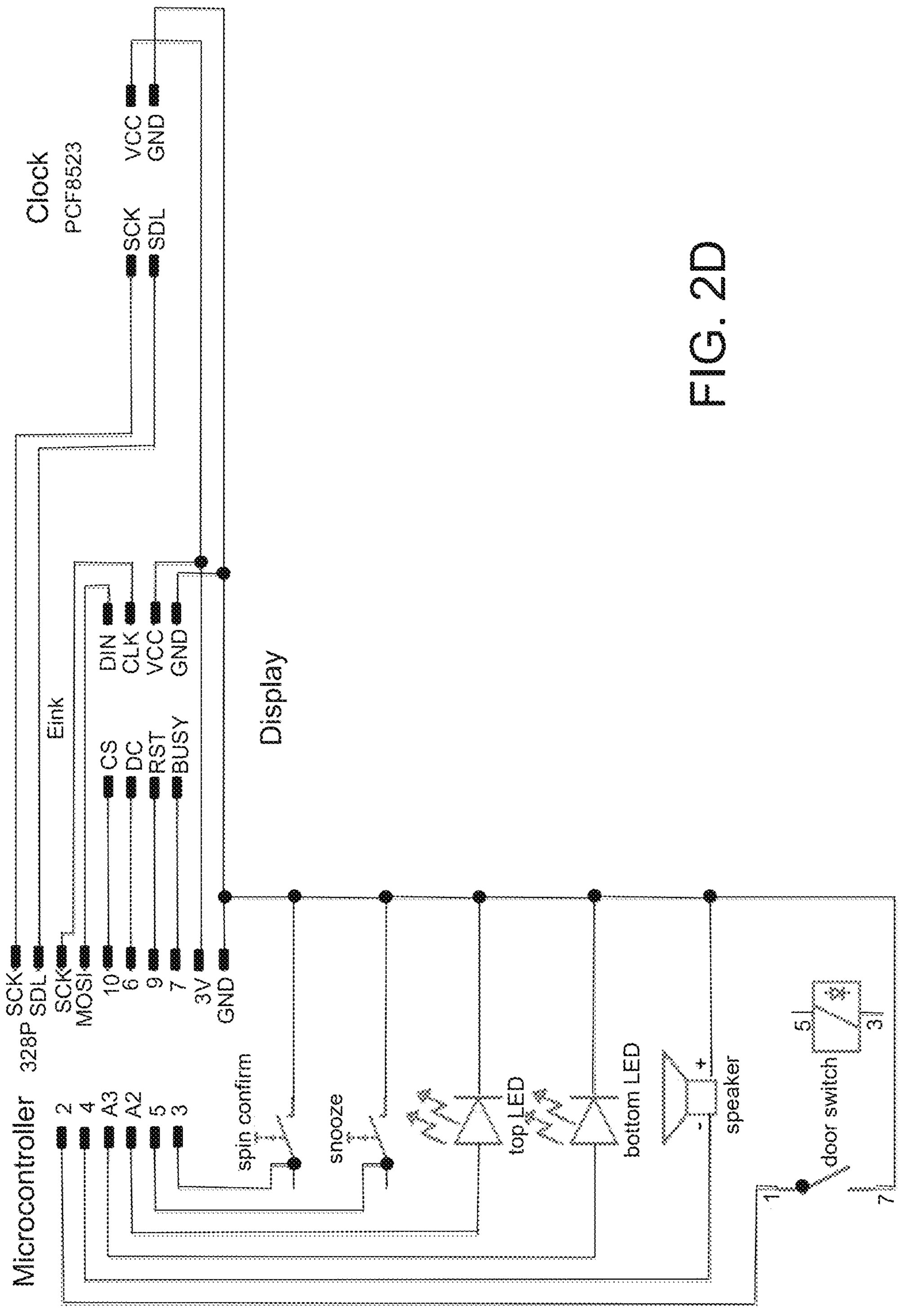
FIG. 2D is an electrical schematic of the first monitor portion of FIGS. 2A to 2C.

In the second exemplary embodiment shown in FIG. 1B, the illustrated alerting and reminder module 100 includes only the first or primary module component or portion 110. That is the separate second or secondary module component or portion 150 is eliminated as described in more detail hereinafter.

The illustrated security container 200 is located within a security environment or area 300 such as, for example but not limited to, a Sensitive Compartmented Information Facility (SCIF), and the like. In this specification and the claims, a "security environment" or "security area" means an enclosed area in which access is limited to individuals with appropriate security clearances. A SCIF is an enclosed area within a building and the like that is used to process sensitive compartmented information (SCI) types of classified information. A SCIF can be either permanent or temporary and can be set up in official government buildings, onboard ships, in private residences of officials, or in hotel rooms and other places of necessity for officials when traveling. Because of the operational security (OPSEC) risk they pose, personal cell phones, smart watches, computer flash drives (aka, "thumb drives"), and any other sort of Personal Electronic Device (PED), wearable electronic devices, cameras (analog or digital) other than those that are U.S. Government property and which are used only under strict guidelines, and/or any other sort of audio, image, and/or audio recording or transmitting devices (analog or digital) are expressly prohibited in SCIFs. Wireless networks that enable electronic devices to communicate "over the air" without direct cable connections such as, for example but not limited to, Wi-Fi, Bluetooth, Zigbee, and the like is generally prohibited and/or actively blocked within such security environments. Security environments 300 have a higher need for systems and methods for ensuring that security containers 200 located therein are properly secured before the user leaves the security environment 300. The present invention addresses this need with all alerts and reminders provided by a portable package that suitably operates within such security environments 300 without modifications to the security containers 200.

FIGS. 2A to 2D illustrate an exemplary embodiment of the first monitor portion 110 of the alerting and reminder module 100 according to the present invention. The illustrated first monitor portion 110 includes a housing 111 having a rear case 112 and a front plate or cover 113 that covers a front opening of the rear case 112 to form an internal space or cavity for internal components as described in more detail hereinafter. The illustrated rear case 112, the front plate 113, and at least some of the internal components are secured together by a plurality of mechanical fasteners 114. It is noted that the rear case 112, the front plate 113, and the secured internal components can alternatively be secured together by any other suitable means known in the art.

The illustrated rear case 112 includes at least one opening for an audible output device 115 which is at least partially located within the housing 111. It is noted that the illustrated opening for audible output device 115 is located in a top wall of the rear case 112 but can alternatively be located at any other suitable location. The illustrated audible output device 115 is an audible alarm or alert but alternatively be any other suitable device known in the art for producing desired audible output. The illustrated audible output device 115 is activated to provide an audible alarm or alert when certain conditions are present as described in more detail hereinafter. It is noted that alternatively the audible output device 115 can be eliminated if desired or there can be additional audible output devices 115 provided if desired.

The illustrated front plate 113 includes at least one opening for a first visual output device 116 which is at least partially located within the housing 111. The illustrated first visual output device 116 is a digital display but can alternatively be any other suitable device known in the art for producing desired visual output. It is noted that alternatively the first visual output device 116 can be located at a different suitable location if desired, can be eliminated if desired, and/or there can additional first visual output devices 118 provided if desired. It is also noted that the illustrated display 116 is an E-ink display that produces black/white images using low power. but can alternatively be any other suitable type of digital and/or electronic display such as, for example but not limited to an LCD display or the like.

The illustrated front plate 113 also includes at least one opening for a second visual output device 117 which is at least partially located within the housing 111. The illustrated second visual output device 117 is an LED but can alternatively be any other suitable device known in the art for producing desired visual output. It is noted that alternatively the second visual output device 117 can be located at any other suitable location if desired, can be eliminated if desired, and/or there can be additional second visual output devices 117 provided if desired. The illustrated second visual output device 117 is located near a first input device 118. The illustrated front plate 113 also includes at least one opening for the first input device 118 which is at least partially located within the housing 111. The illustrated first input device 118 is a push-button switch but can alternatively be any other suitable device known in the art for receiving desired input. The illustrated first illustrated input device 118 is utilized by the user to confirm that the lock dial 206 of the security container lock 204 has been manually spun to its locking position as described in more detail hereinafter. It is noted that alternatively the first input device 118 can be located at a different suitable location if desired, can be eliminated if desired, and/or there can additional first input devices 118 provided if desired. The "lock confirmation" or first input device 118 can be operably connected to the "lock confirmation indicator" or second visual output device 117 such that the "lock confirmation indicator" or second visual output device 117 is automatically activated when the "lock confirmation" or first input device 118 is manually activated by the user.

The illustrated front plate 113 also includes at least one opening for a third visual output device 119 which is at least partially located within the housing 111. The illustrated third visual output device 119 is an LED but can alternatively be any other suitable device known in the art for producing desired visual output. The illustrated third visual output device 119 is located near a second input device 120. It is noted that alternatively the third visual output device 119 can be located at any other suitable location if desired, can be eliminated if desired, and/or there can be additional second visual output devices 117 provided if desired. The illustrated front plate 113 also includes at least one opening for the second input device 120 which is at least partially located within the housing 111. The illustrated second input device 120 is a push-button switch but can alternatively be any other suitable device known in the art for receiving desired input. The illustrated second input device 120 is utilized by the user to indicate that it is desired to leave the closure 203 of the security container 200 open for an additional preset period of time as described in more detail hereinafter. It is noted that alternatively the second input device 120 can be located at a different suitable location if desired, can be eliminated if desired, and/or there can additional second input devices 120 provided if desired. The "snooze button" or second input device 120 can be operably connected to the "snooze confirmation indicator" or third visual output device 119 such that the "snooze confirmation indicator" or third visual output device 119 is automatically activated when the "snooze button" or second input device 120 is manually activated by the user.

The illustrated front plate 113 also includes at least one opening for a fourth visual output device 121 which is at least partially located within the housing 111. The illustrated fourth output device 121 is a LED but can alternatively be any other suitable device known in the art for producing desired visual output. The illustrated fourth visual output device 21 is located near a third input device 121A. It is noted that alternatively the fourth visual output device 121 can be located at any other suitable location if desired, can be eliminated if desired, and/or there can be additional fourth visual output devices 117 provided if desired. The illustrated housing 111 also includes at least one opening for the third input device 121A which is at least partially located within the housing 111. The illustrated third input device 121A is a charging port at least partially within the housing 111 and operably connected to a battery 122 located within the housing 111 for selectively connecting the battery 122 with an external electrical power supply to charge the battery 122. The battery 122 is in turn operably connected to each item of the first monitor portion 110 either directly or indirectly that requires electric power. It is noted that alternatively the third input device 121A can be located at a different suitable location if desired, and/or can be of a different suitable type or configuration if desired. It is also noted that alternatively the first monitor portion 110 can be electrically powered in any other suitable manner if desired. The fourth visual output 121 is preferably activated when the first monitor portion 110 is powered by the battery 122 and/or when the battery 122 is charging by use of the charging port 12A.

The front plate 113 also includes at least one opening for a fourth input device 130 which is at least partially located within the housing 111. The illustrated fourth input device 130 is a power on/off switch at least partially within the housing 111 and operably connected to the battery 122 located within the housing 111 for selectively connecting and disconnecting the battery 122 with the electrically-powered components. It is noted that the power on/off switch can alternatively have any other suitable configuration or could be eliminated if desired.

The first monitor portion 110 of the alerting and reminder module 100 further includes at least one sensor 123 that operates as a door switch that indicates whether the closure 203 of the security container 200 is open or closed. In the first exemplary embodiment of FIG. 1A, the illustrated sensor 123 senses the presence of the second monitor portion 150 of the alerting and reminder module 100. That is, the sensor 123, along with the second monitor portion 150, operate as a door switch that indicates whether the closure 203 of the security container 200 is open or closed. The illustrated sensor 123 is non-contact magnetic proximity sensor or the like that detects the presence of a nearby magnetic object without any physical contact. It is noted that the target of the illustrated sensor 123 is the second monitor portion 150 which in its illustrated embodiment is a permanent magnet as discussed in more detail hereinafter. The target, characterized by its magnetic field, triggers the switching process of the magnetic proximity sensor when it enters the detection range of the magnetic proximity sensor. It is noted that the sensor 123 can alternatively be of any other suitable type such as, for example but not limited to, a non-contact inductive proximity sensor (emits an electromagnetic field and looks for changes in the field), a non-contact photoelectric proximity sensor (emits a beam of radiation such as, for example but not limited to, infrared light and looks for a reflected return signal), a contact proximity switch (makes electrical contact with the target), or any other suitable type of proximity switch. The object being sensed is typically referred to as the proximity sensor's target. The different types of proximity sensors demand different types of targets. For example, but not limited to: (1)

a magnet proximity sensor requires a target comprising a permanent magnet; (2) an inductive proximity sensor requires a target comprising a ferromagnetic metal; (3) a photoelectric proximity sensor requires a target that can reflect the emitted radiation; and (4) a conductive proximity sensor requires a target that is electrically conductive.

In the second exemplary embodiment of FIG. 1B, the illustrated sensor 123 senses the presence of the security container front frame 205 or other portion of the security container housing 201. That is, the sensor 123, along with the security container housing 201, operate as a door switch that indicates whether the closure 203 of the security container 200 is open or closed. The sensor 123 can be, for example but not limited to, a pushbutton style or contact switch that senses and/or engages the security container housing 201 of the security container 200, but no additional "target" (second monitor portion 150) is needed. It is noted that the sensor can be of any other suitable type such as, for example but not limited to, a non-contact proximity switch such as, for example but not limited to a photoelectric sensor or the like, or a contact proximity switch such as, for example but not limited to a conductivity proximity sensor or the like.

The at least one sensor 123 may further include a "spin" sensor which detects spinning of the lock dial 206 instead of relying solely on users to manually and honestly confirm that they spun the lock dial 206 as described in more detail hereinafter. The spin sensor can operate by, for example but not limited to, optics, vibration, magnetics, acoustics, and/or the like to determined that the lock 204 has been properly locked, e.g., the security container closure 203 is in the closed position, and that the security container lock dial 206 has been sufficiently spun (rotated a sufficient number of times), confirming that the security container 200 is secure. Note that spinning the lock dial 206 is what activates the bolt to physically locks the door(s) 203A, 203B. It is also noted that any other suitable quantity, configuration, an/or type of sensors 123 can alternatively be utilized.

The illustrated first monitor portion 110 further includes microcontroller 124 integrated with the other parts to operate as described herein. The illustrated microcontroller 124 is a single board microcontroller such as an Arduino single board microcontroller utilizing an ATmega328P single chip microprocessor 125 with one or more CPUs along with memory 126, and programmable input/output peripherals. The microcontroller 124 is programmed to provide each of the desired functions described herein. It is noted that the microcontroller 124 can alternatively be of any other suitable quantity, configuration, or type.

The illustrated embodiment of the first monitor portion 110 also includes a clock 127 and a data logger 128 operatively connected to the microcontroller 124. The illustrated clock 127 is a PCF8523 real time clock with battery back-up in case of power failure. It is noted that any other suitable clock can alternatively be utilized. The illustrated data logger 128 can be of any suitable type to provide a log of time and date stamps showing at least the last time the security container closure 203 was in an open configuration. The information can be displayed on the digital display 116. The log of time and date stamps can include just the time and date stamp for the last time the security container closure 203 was open, a complete log of time and date stamps for a designated period of time that show when the security container closure 203 was in an open configuration, or any number of time and date stamps therebetween. Any of these options is useful for security managers and security incident inquiry officials for times when a security container 200 is found unsecured and unguarded, to facilitate determinations about whether sensitive assets or information were exposed, how long, and to whom. Having at least the two most recent date and time stamps displayed on the display 116 is important, instead of only the one most recent opening, in certain scenarios. For instance, imagine a person who conducts security checks on the security container 200, walks up to the security container 200, grabs the handle and attempts to pull open the closure 203 to see if it has been securely shut. The closure 103 immediately pulls open, without dialing in the combination, because it was inadvertently left unsecured by the previous user at some unknown time. The security checker now realizes there has been a security incident and can look at the digital display 116 to confirm the last two times: (1) when the security container 200 was just opened by the security checker him/herself; and (2) the last time the security container 200 was opened preceding the current opening. Now, when the security incident inquiry is being conducted by an inquiry official, they can more easily and with greater confidence determine whether information contained with the security container 200 had been accessed outside of expected time windows and can be checked against the timelines provided by the offending user as well as any relevant witnesses, and whether there was a data spill that needs further attention. It is noted that the clock 127 and/or data logger 128 can alternatively have any other suitable configuration, and/or can be illuminated if desired.

The illustrated first monitor portion 110 further includes at least one fastener 129 that operably and removably attaches the first monitor portion 110 to the security container 200 in a desired position. The illustrated fastener 129 is at least one magnet that operably and removably attaches the first monitor portion 110 to the security container 200 adjacent the second monitor portion 150. The fastener 129 can alternatively be at least one hook and loop fastener, suction cup, adhesive tape, belt, clamp, and/or the like. It is noted that the at least one magnet permits the first monitor portion 110 to be easily and quickly moved to any desired position on the security container 200 which is in the form of a metal file cabinet. It is also noted that when the security container 200 does not comprise a suitable metal, the fastener 129 is required to be of a different type than a magnet. It is noted that magnets or other non-permanent attachment scheme is preferred due to GSA regulations—which preclude permanent attachments to GSA containers; preclude drilling into GSA containers; etc. as these would immediately void their GSA certification.

Figure 3A:
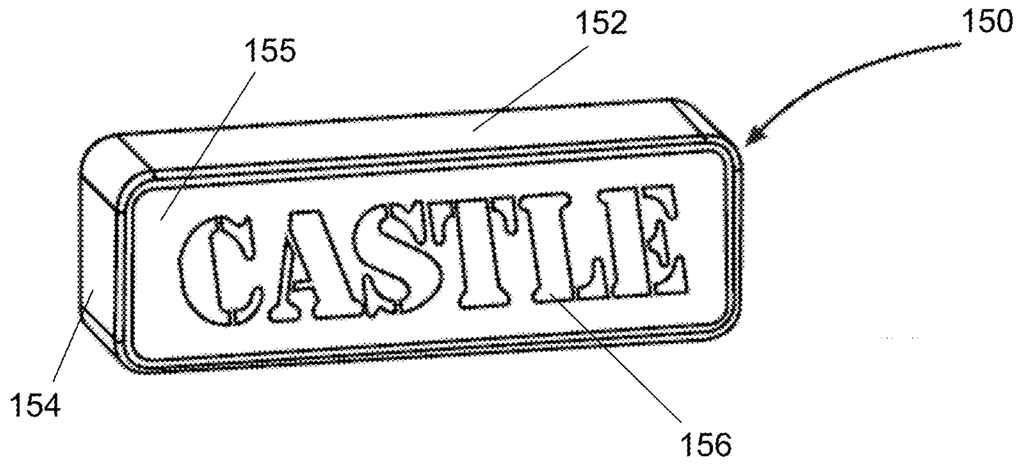
FIG. 3A is a perspective front view of a second monitor portion of the alerting and reminder monitor of FIG. 1A but removed from the security container.
Figure 3B:
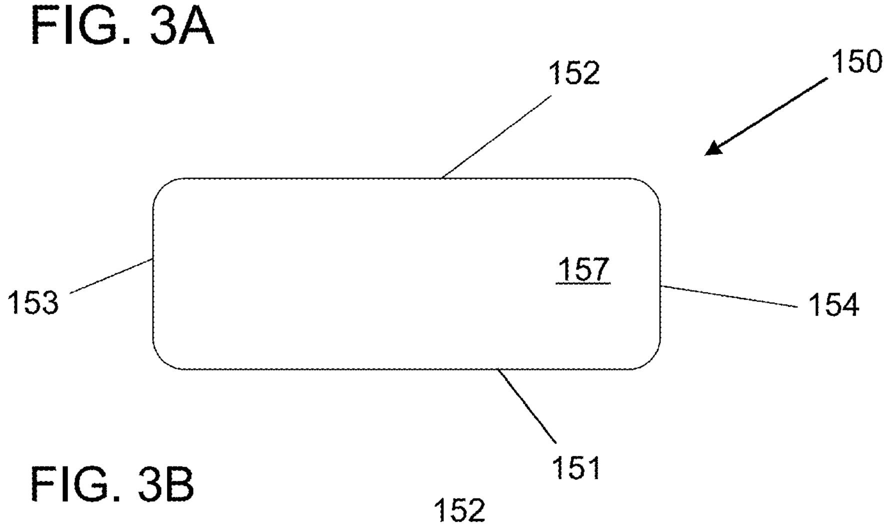
FIG. 3B is a rear view of the second monitor portion of FIG. 3A.

As best shown FIGS. 3A and 3B, the illustrated secondary or second monitor portion 150 is configured to cooperate with the at least one sensor 123 of the first monitor portion 110 to operate as a door switch for indicating when the closure 203 of the security container 200 as discussed hereinabove. Accordingly, the second monitor portion 150 must comprise a suitable shape and material for interacting with the first monitor portion 110. The illustrated second monitor portion 150 has the shape of a rectangular cuboid but it is noted that any other suitable shape can alternatively utilized. The bottom side surface 151 is substantially planar to interact with the sensor 123 of the first monitor portion 110. It is noted that in the illustrated embodiment, the top side 152, left side 153, and right side 154 are each also substantially planar so that the second monitor portion 150 can be selectively utilized in different locations as described hereinbelow in more detail. The illustrated front side 155 is provided with indicia 156. It is noted that the indicia can alternatively comprise any other word, phrase, symbol, number etc. as desired, can have any other configuration, or can be eliminated if desired. The illustrated rear or back side 157 is also substantially planar so that it can substantially contact a desired surface of the security container 200 as described in more detail hereinafter. It is noted that any of the sides 151, 152, 153, 154, 155, and 157 can alternatively have any other suitable configurations that functionally sense door open versus door closed positions.

The illustrated second monitor portion 150 is formed entirely by a permanent magnet to cooperate with the sensor 123 (a non-contact magnetic proximity sensor) of the first monitor portion 110. It is noted that the first monitor portion 150 can alternatively comprise any other suitable materials such as, for example but not limited to, ferromagnet metal, electrically-conductive metals, plastic, wood, glass, composites, or any other suitable material. However, it is also noted that the second monitor portion 150 must comprise material(s) suitable for interaction with the sensor 123 of the first monitor portion 150. It is noted that alternatively a sensor system suitable for this function can be incorporated into the first module portion 110 such that a separate second module portion 150 is not needed. The important point is sensing door open versus door closed positions.

The illustrated second monitor portion 150 further includes at least one fastener 158 that operably and removably attaches the second monitor portion 150 to the security container 200 in a desired position. The illustrated fastener 158 is the rear or back side 157 of the second monitor portion 150 which is formed by a permanent magnet that operably and removably attaches the second monitor portion 110 to the security container 200 adjacent the second monitor portion 150. The fastener 158 can alternatively be, for example but not limited to, at least one hook and loop fastener, suction cup, adhesive tape, belt, clamp, and/or the like. It is noted that the fastener 158 preferably permits the second monitor portion 150 to be easily and quickly moved to any desired position on the security container 200 which is in its illustrated form, is a metal file cabinet. It is also noted that when the security container 200 does not comprise a suitable ferromagnetic metal, the fastener 129 is required to be of a different type than a permanent magnet. It is noted that magnets or other non-permanent attachment scheme is preferred due to GSA regulations—which preclude permanent attachments to GSA containers; preclude drilling into GSA containers; etc. as these would immediately void their GSA certification.

Figure 3C:
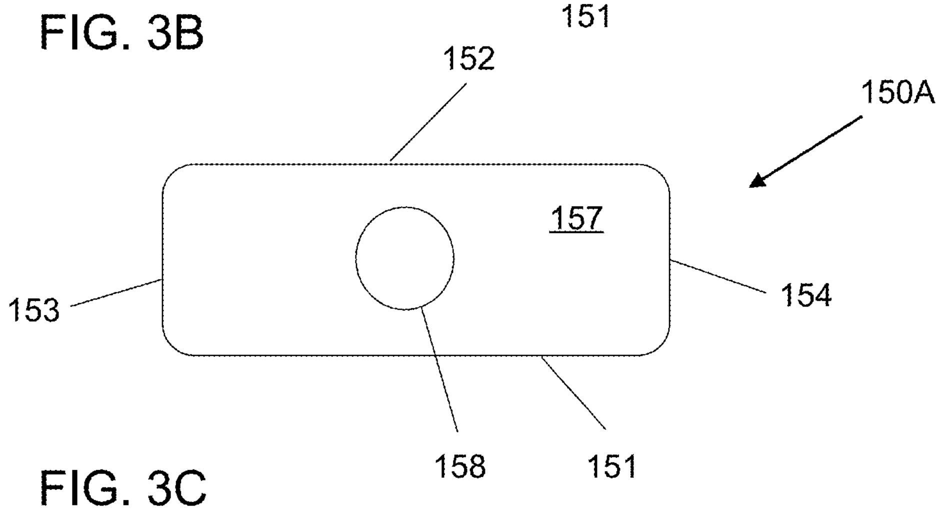
FIG. 3C is a rear view similar to FIG. 3B but showing an alternative embodiment of the second monitor portion.

FIG. 3C illustrates an alternative embodiment where the second monitor portion 150A comprises a material other than a permanent magnet and the fastener 158 is a permanent magnet embedded within the back side 157. It is noted that the second monitor portion 150A can comprise any suitable material(s) such as, for example but not limited to, ferromagnet metal, electrically-conductive metals, plastic, wood, glass, composites, or any other suitable material. However, it is also noted that the second monitor portion 150A must comprise a material(s) suitable for interaction with the sensor 123 of the first monitor portion 110. It is further noted that the fastener 158 can alternatively be any other suitable type of fastener such as, for example but not limited to, at least one hook and loop fastener, suction cup, adhesive tape, belt, clamp, and/or the like.

As best shown in FIG. 1A, the illustrated alerting and reminder monitor 100 of the first exemplary embodiment is operably and removably attached to the security container 200 along an upper interface between the security container closure 203 and the security container front frame 205 with the first monitor portion 110 located adjacent an upper edge of the security container closure 203 and the second monitor portion 150 located adjacent an edge of the security container opening 202 juxtaposed to the first monitor portion 110 when the security container closure 203 is closed. More specifically, the bottom side 151 of the second monitor portion 150 is located juxtaposed the door closure sensor 123 of the first monitor portion 110. It is noted that while the illustrated alerting and reminder module 100 is located at the left side of the upper interface between the security container closure 203 and the security container front frame 205, it can alternatively be located at any other location along the upper interface. It is also noted that the alerting and reminder module 100 can alternatively be located along any other interface between the security container closure 203 and the security container front frame 205 but the first monitor portion may need to be secured in a different orientation or have a different configuration where the door close sensor is at a different location within the first monitor portion 110 so that it will be adjacent the second monitor portion 150. The illustrated first monitor portion 110 is operably and removably secured to the security container closure 203 by the magnet or other fastener 129 on the rear side of the first monitor portion housing 111 which is magnetically attracted to the closure 203 which is formed of a ferromagnetic metal. The illustrated second monitor portion 150 is operably and removably secured to the security container front frame 205 by magnetic attraction as the illustrated second monitor portion 150 is a magnet and the security cabinet front frame 205 is formed of a ferromagnetic metal. It is noted that the first and second monitor portions 110, 150 can alternatively be secured to opposite components of the security container 200. That is the first monitor portion 110 could be secured to the housing 201 of the security container 200 and second monitor portion 150 could be secured to the closure 203 of the security container.

A position indicator 131 can be provided on the housing 111 of the first monitor portion 110 to indicate where the second monitor portion 150 should be attached to align with the sensor 123 of the first monitor portion 110. The illustrated position indicator 131 is a pair of parallel and spaced apart raised marks on the top of the housing 111 (best shown in FIG. 2A) that indicate the second monitor portion 150 should be located therebetween. It is noted that the position indicator 131 can alternatively be of any other suitable type such as, for example but not limited to, notch marks, surface marks, stickers, or the like or can be eliminated if desired. This position indicator 131 facilitates proper positioning of the second monitor portion 150 relative to the first monitor portion 110 when installing the alerting and reminder module 100.

As best shown in FIG. 1B, the illustrated alerting and reminder monitor 100 of the second exemplary embodiment of the invention is operably and removably attached to the closure of the security container 200 so that the first monitor portion 110 is positioned over an upper interface between the security container closure 203 and the security container front frame 205 with an upper portion the first monitor portion 110 located adjacent the front of the security container front frame 205 and a lower portion of the first monitor portion 110 located adjacent the security container closure 203 when the security container closure 203 is closed. More specifically, the door closure sensor 123 of the first monitor portion 110 is positioned adjacent the security container front frame 205 in order to determine if the closure 203 is open or closed. It is noted that while the illustrated alerting and reminder module 110 is located at the left side of the upper interface between the security container closure 203 and the security container front frame 205, it can alternatively be located at any other suitable location along the upper interface. It is also noted that the alerting and reminder module 100 can alternatively be located along any other suitable interface between the security container closure 203 and the security container front frame 205 but the first monitor portion may need to be secured in a different orientation or have a different configuration where the door closure sensor 123 is at a different location within the first monitor portion 110 so that it will be adjacent the security container front frame 205. The illustrated first monitor portion 110 is operably and removably secured to the security container closure 203 by the magnet or other fastener 129 on the rear side of the first monitor portion housing 111 which is magnetically attracted to the closure 203 which is formed of a ferromagnetic metal.

Figure 5:
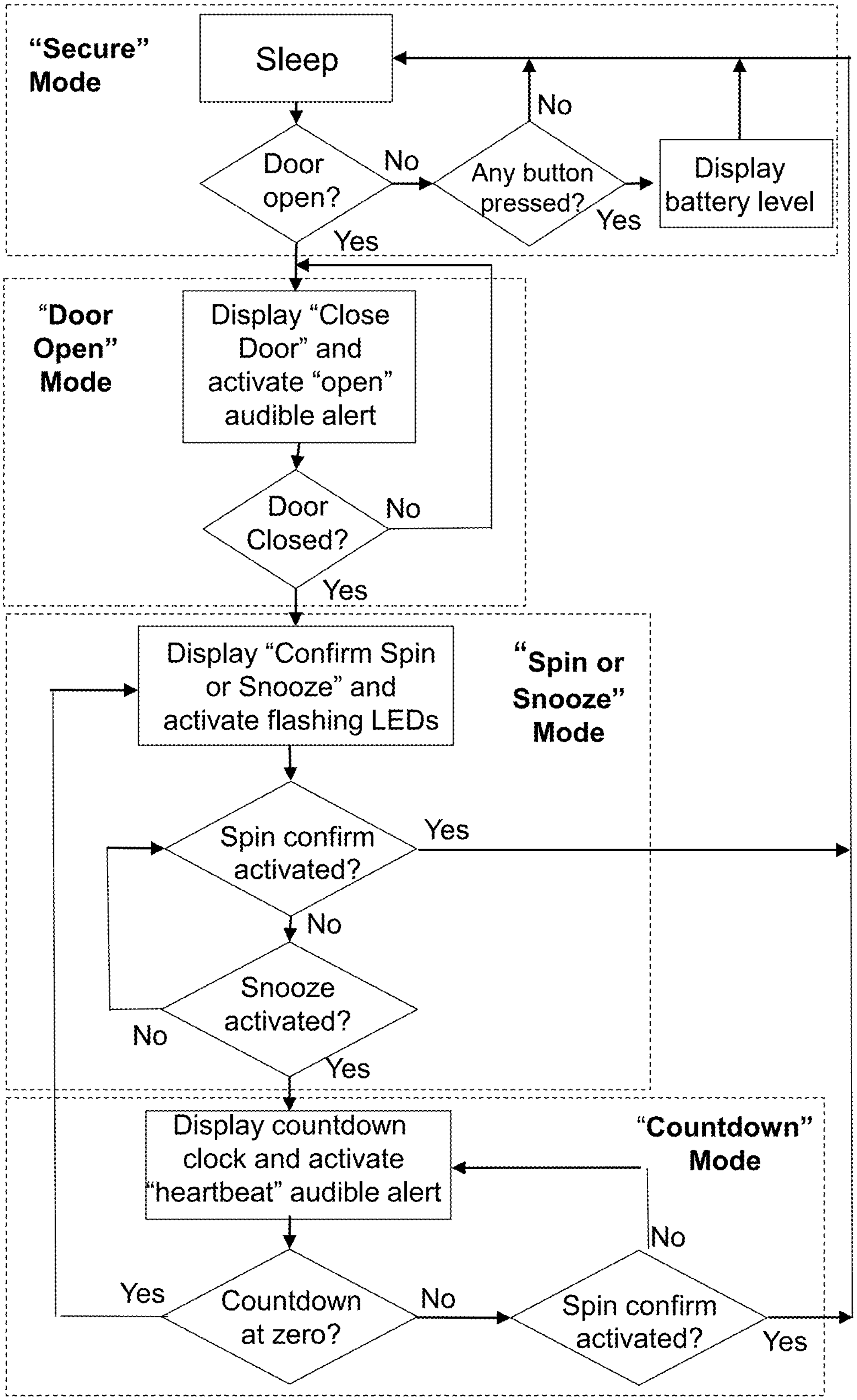
FIG. 5 is an exemplary logic diagram for the alerting and reminder monitor of FIGS. 1 to 4.

FIGS. 4 and 5 show that the illustrated alerting and reminder module 100 operates in four different modes of operation: (1) a first or "Secure" mode; (2) a second or "Door Open" mode; (3) a third or "Spin or Snooze" mode; and (4) and a fourth or "Countdown" mode. When in the first or "Secure" mode, the illustrated alerts and reminder can only transition to the second or "Door Open" mode which occurs when the user opens the closure 203 of the security container 200 (best shown in FIG. 5). When in the second or "Door Open" mode, the illustrated alerting and reminder module 100 can only transition to the third or "Spin or Snooze Mode" which only occurs when the user closes the security container closure 203 (best shown in FIG. 5). When in the third or "Spin or Snooze" mode, the illustrated alerting and reminder module 100 can transition either back to the first or "Secure" mode or to the fourth or "Countdown" mode depending on input from the user (best shown in FIG. 5). However, it is noted that when in the third or "Spin or Snooze" mode, the alerting a reminder module 100 can also transition back to the second or "Door Open" mode if someone manually opens the closure 203 of the security container 200 when in the "spin or Snooze' mode. That is, there is a "Door Closed" query in the third or "Spin or Snooze" mode that is not shown in FIG. 5. When in the fourth or "Countdown" mode, the illustrated alerting and reminder module 100 can only transition back to the first or "Secure" mode which occurs when the user confirms that they have spun the dial 206 of the security container lock 204 (best shown in FIG. 5). However, it is noted that when in the fourth or "Countdown" mode, the alerting a reminder module 100 can also transition back to the second or "Door Open" mode if someone manually opens the closure 203 of the security container 200 when in the "Countdown" mode. That is, there is a "Door Closed" query in the fourth or "Countdown" mode that is not shown in FIG. 5. It is also noted that the alerting and reminder module 100 can alternatively have any other suitable logic flow.

As best shown in FIG. 6A, while in the first or "Secure" mode with the security container closure 203 shut and secured, the alerting and reminder module 100 operates under low power or is "asleep" until awakened. The visual display 116 displays the status such as, for example but not limited to, the text "Safe Secured" or a like. The visual display 116 can also display the date and time stamps for at least the most recent two openings detected and logged by the alerting and reminder module 100. Preferably only the two most recent openings are displayed. While in the "Secure" mode, the remaining battery power can be manually checked by the user by pressing either of the push-buttons 118, 120. When activated in this manner, the remaining percentage of battery power is displayed on the visual display 116 for five seconds before being cleared off visual display 116 and the alerting and reminder module 100 returns to lower power. It is noted that alternatively the remaining percentage of battery power can be displayed for any other suitable predetermined period of time. This "Secure" mode is considered the default mode of operation of the alerting and reminder module 100. It is noted that the first or "Secure" mode can alternatively have any other suitable configuration.

When the user desires to open the security container 200, the user rotates the lock dial 206 for the combination of the lock 204 which unlocks the lock 204. Next, the user turns the mechanical handle and pulls the handle to open the security container closure 203. The alerting and reminder module 100 detects that the security container closure 203 is open via the door closure sensor 123, exits the first or "Secure" mode, and enters the second or "Door Open" mode.

As best shown in FIG. 6B, while in the second or "Door Open" mode, a visual prompt for the user to close the security container closure 203 such as, for example but not limited to, the text "Close Door" or the like is displayed on the visual display 116. Additionally, a one-minute timer is immediately started. It is noted that the timer can alternatively have any other suitable period of time. If the user does not close the security container closure 203 during the one-minute period of time (that is, the closure 203 remains open), an audible alarm or alert such as, for example but not limited to, three quick beeps or the like is provided by the audible alarm or alert 115. The audible alert continues to be provided at progressively smaller time intervals and/or larger volumes, as long as the security container closure 203 remains open. For example, but not limited to, the first increment is 1 minute before alerting, then 45 seconds, decreasing by 15 second intervals each time until the audible alert is sounding continuously. This audible alert serves as a recurring (then constant) reminder to the user (and perhaps other nearby colleagues) that there is an open and unsecured security container 200 that shouldn't be left unattended. Importantly, this reminder scheme encourages users to shut the security container closure 203 immediately after use (accessing documents or items), and to not stray away from the space with the security container closure 203 open and unsecured. It is noted that the second or "Door Open" mode can alternatively have any other suitable configuration.

When the user closes the security container closure 203, the alerting and reminder module 100 detects that the security container closure 203 is closed via the door closure sensor 123, exits the second or "Door Open" mode, and enters the third or "Spin or Snooze" mode. This third or "Spin or Snooze" mode is designed to "force" the user into immediately choosing one of two actions: (1) spin the lock dial 206 to secure the security container 200 and confirm to halt the audible alert, or (2) add working time to the time, that is "snooze" the audible alerts, in order to continue working out of the unsecured security container 200 without continuing the "annoying" audible alert.

As best shown in FIG. 6C, the third or "Spin or Snooze" mode is designed to to politely force an action by the user. The alerting and reminder module 100 continues to provide the continuous audible alerts or beeps until an action is selected by the user. To clarify to the user that one of the two push buttons 118, 120 should be pressed, the associated LED's 117, 119 next to each push button 118, 120 are alternatively flashed back-and-forth indicating the two possible choices until one of the two actions is selected. Adjacent to the LED's 117, 119 and the push buttons 118, 120, the visual display 116 displays instructions next to each respective push button 118, 120 such as, for example but not limited to, the text "Confirm Dial Spin" and "Snooze/Add Working Time" or the like. If the user wishes to secure the security container 200, the user simply spins the dial 206 to deploy the lock bolt, and then presses the "Confirm Dial Spin" push button 118 which silences the audible alerts, turns off the LED's 117, 119, and puts the alerting and reminder module 100 back into the first or "Safe Secure" mode. If the user instead wishes to keep the security container 200 unsecured temporarily, the user should press the "Snooze/Add Working Time" button 120, which silences or alters all of the audible alerts or alarms and pushes the reminder module 100 into the fourth or "Countdown" mode. It is noted that the third or "Spin or Snooze" mode can alternatively have any other suitable configuration.

As best shown in FIG. 6D, in the fourth or "Countdown" mode, a user may choose to "work out of the safe" for a few minutes or hours, which is common so that they don't have to repeatedly shut, lock, then unlock, then re-open the security container 200 throughout the workday. To do so, the user can press the "Snooze/Add Working Time" push button 120 to add 15-minute increments to a countdown timer, which immediately begins counting down to zero with no further actions/inputs needed by the user. It is noted that the 15-minute increments can alternatively be any other suitable period of time. The time remaining of the selected period of time is displayed on the display screen 116 throughout the time the alerting and reminder module 100 is in the fourth or "Countdown" mode.

During the countdown, before the timer reaches zero, the audio alerts or alarms provided by the audible alarm 115 are paused or altered. Preferably, the audio alerts or alarms are altered to a "heartbeat" audio alerts or alarms which consist of a quick double-beep audio cue. These "heartbeat" audio alerts do not signal a required action by the user, but simply serve as a reminder that the security container 200 is in an unsecured state. This "heartbeat" reminder occurs at 2-minute intervals throughout the entire countdown period. It is noted that the 2-minute intervals can alternatively be any other suitable period of time. It is also noted that the audio alerts or alarms can be altered in any other suitable manner which makes them less annoying to the user which typically means they are less frequent and/or lower volume. Increments of 15-minutes can be added at any time during the countdown period by pressing the "Snooze/Add Time" push button 120 in order to add more working time. If at any time during the countdown, the user is ready to stop working out of the security container 200, and wishes to secure the security container 200, the user simply spins the lock dial 206 and presses the "Confirm Dial Spin" push button 120. This exits the fourth or "Countdown mode and returns the alerting and reminder module 100 to the first or "Safe Secure" mode which operates as described hereinabove. If the countdown timer reaches zero, the alerting and reminder module 100 exits the fourth or "Countdown mode and returns to the third or "Spin or Snooze" mode which operates as described hereinabove. It is noted that the fourth or "Countdown" mode can alternatively have any other suitable configuration.

It can be appreciated from the above description, that the "Snooze/Add Time" button 120 allows the security container 200 to remain open while the safe operator/user is reminded periodically that the security container 200 is open. Thus, training and reenforcing the importance of closing and locking the security container 200 before leaving the area. The timed alarm regularly reinforces this training of the safe operator/user by providing regular auditory and visual alerts and/or reminders to the safe operator/user that the safe is currently in an unsecured status. Some alerts are passive with no action required. Other alerts may be more intrusive and require actions by the user to silence, in order to encourage or behaviorally "nudge" specific desired actions by the user.

It can be additionally appreciated from the above description, that the "Spin confirm" button 118 along with other reminder cues to spin the dial 206 when the closure 203 has been closed and/or when the planned working time has elapsed trains the safe operator user to secure the security container 200 and reinforces that the lock dial 206 must be spun in order to secure the security container 200.

It can be further appreciated from the above description, that the log of time and date stamps showing when the security container closure 203 was last in an opened is useful for security managers and security incident inquiry officials when a security container is found unsecured and unguarded, to facilitate determinations about whether sensitive assets or information were exposed, how long, and to whom. Having the most recent two date and time stamps is important, instead of only displaying the one most recent opening, in certain scenarios. For instance, imagine a person conducting security checks on the security container 200, walks up to the security handle, grabs the handle, and attempts to pull open the security container closure 203 to see if it has been securely shut. It immediately pulls open, without dialing in the combination, because it was inadvertently left unsecured by the previous user at some unknown time. The security checker now realizes there has been a security incident and can look on the display to confirm the two times: (1) when the security container 200 was just opened by the security checker him/herself; and (2) the last time the security container 200 was opened preceding the current opening. Now, when the security incident inquiry is being conducted by an inquiry official, they can more easily and with greater confidence determine whether information contained with the security container had been accessed outside of expected time windows and can be checked against the timelines provided by the offending user as well as any relevant witnesses, and whether there was a data spill that needs further attention.

It can be also appreciated from the above description that the alerting and reminder module 100 may additionally include a tamper-detection feature wherein the data logger 128 or the like may record movement, removing, tilting or a combination thereof of the first module portion 110 of the alerting and reminder module 100. One or more additional sensors 123 may be provided for detecting the movement, removing, tilting, or combination thereof. Such detection of such movements may further activate the audible alarm 115. Additionally, the power switch 130 may be located at the rear side of the housing 111 of the first monitor portion 110 so that it is located between the housing 111 and the security container 200 This location ensures that movement of the first monitor portion 110 will activate the tamper-detection feature before the power switch 130 of the first module portion 110 can be turned off.

In yet another embodiment, a "spin" sensor is provided for the lock dial 206 so that instead of only relying on the user to manually spin the lock dial 206 and honestly confirm that they spun the lock dial 206, the "spin" sensor can confirm that the lock dial 206 actually spun. The "spin sensor" can be an optical, magnetic, vibrational, acoustic, or other sensor that detect the spinning of the lock dial 206. If it is known that the security container closure 203 is in the closed position, and that the lock dial 206 has been sufficiently spun (rotated a sufficient number of times), while the security container closure 203 is in the closed position, the alerting and reminder module 100 would then "know" that the security container 200 has been locked without requiring any additional manual input by user to confirm that the security container 200 has been locked.

It should be understood that each of the above-described embodiments of the present invention can alternatively have any suitable materials, features, components, and/or configurations of any of the other described embodiments.

The terms "comprises," "comprising," "includes," "including," "has," "having," or any other variations thereof used herein, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference to "one embodiment," "certain embodiments," "an embodiment," "implementation(s)," "aspect(s)," or similar terms used herein means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps, or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All patents, patent applications (and any patents which issue thereon, as well as any corresponding published foreign patent applications), publications, and other documents mentioned throughout this description are hereby incorporated by reference herein. It is expressly not admitted, however, that any of the documents incorporated by reference herein teach or disclose the present invention.

The words "about," "approximately," or the like, when accompanying a numerical value, are to be construed as indicating a deviation as would be appreciated by one of ordinary skill in the art to operate satisfactorily for an intended purpose.

For each numerical range throughout this specification and the claims, it should be understood that every maximum numerical limitation given includes every lower numerical limitation, as if such lower numerical limitations were expressly written herein. Also, for each numerical range throughout this specification and the claims, it should be understood that every minimum numerical limitation given includes every higher numerical limitation, as if such higher numerical limitations were expressly written herein. Furthermore, every numerical range given throughout this specification and the claims includes every narrower numerical range that falls within such broader numerical range.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

References herein to items in the singular should be understood to include items in the plural, and vice versa, unless explicitly stated otherwise or clear from the text.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A monitor for a Government Services Administration (GSA) approved security container, the GSA approved security container having a housing forming an interior space, a closure movable between a closed position blocking access to the interior space and an open position allowing access to the interior space, and a combination lock for selectively locking the closure in the closed position and having a spinning dial for entering a combination to unlock the combination lock, the monitor comprising:

a first monitor portion configured for non-permanent and removable attachment to one of the security container closure and the security container housing outside the security container closure and the security housing and spaced from the combination lock, and comprising;

a sensor for indicating if the closure is open or closed;

an audible alarm;

a first input device configured for activation by a user to confirm that the spinning dial was spun to lock the combination lock with the closure in the closed position; and a fastener for operably, non-permanently, and removably securing the first monitor portion to the outside of the GSA approved security container;

wherein the audible alarm activates when the sensor of the first monitor assembly indicates that the closure is in the open position for a defined period of time; and wherein the audible alarm is only deactivated when the sensor indicates that the closure is in the closed position, and the user input device is activated to confirm that the spinning dial was spun to lock the combination lock with the closure in the closed position.

2. The monitor for a GSA approved security container according to claim 1, further comprising a second monitor portion configured for non-permanent and removable attachment to the other one of the security container closure and the security container housing outside the security container closure and the security housing and spaced from the combination lock and juxtaposed the sensor of the first monitor portion when the security container closure is in the closed position and comprising a fastener for operably, non-permanently, and removably securing the second monitor portion to the GSA approved security container.

3. The monitor for a GSA approved security container according to claim 2, wherein the second monitor portion is a magnet.

4. The monitor for a GSA approved security container according to claim 2, wherein the sensor is a magnetic proximity sensor, and the second monitor portion comprises a magnet configured to interact with the magnetic proximity sensor.

5. The monitor for a GSA approved security container according to claim 1, wherein the first input device is a push button switch.

6. The monitor for a GSA approved security container according to claim 1, wherein the first monitor portion further includes a first visual output device configured to indicate when the first input device has been activated.

7. The monitor for a GSA approved security container according to claim 1, wherein the fastener of the first monitor portion comprises at least one magnet, hook and loop fastener, suction cup, adhesive tape, belt, and/or clamp.

8. The monitor for a GSA approved security container according to claim 1, wherein the sensor of the first monitor portion is a proximity sensor.

9. The monitor for a GSA approved security container according to claim 1, wherein the first monitor portion further comprises a second input device configured for activation by the user when the audible alarm is activated to temporarily pause or alter the audible alarm for a defined period of time.

10. The monitor for a GSA approved security container according to claim 9, wherein the first monitor portion further includes a second visual output device configured to indicate when the second input device has been activated.

11. The monitor for a GSA approved security container according to claim 1, wherein the first monitor portion further includes a clock for providing a current date and time, a data logger configured to log the date and time of at least the last two instances when the sensor of the first monitor assembly is not juxtaposed the second monitor portion.

12. The monitor for a GSA approved security container according to claim 11, wherein the first monitor portion further includes a digital display that displays the date and time of at least the last two instances when the sensor of the first monitor assembly is not juxtaposed the second monitor portion.

13. A monitor for a GSA approved security container, the GSA approved security container having a housing forming an interior space, a closure movable between a closed position blocking access to the interior space and an open position allowing access to the interior space, and a combination lock for selectively locking the closure in the closed position and having a spinning dial for entering a combination to unlock the combination lock, the monitor comprising:

- a first monitor portion configured for non-permanent and removable attachment to one of the security container closure and the security container housing outside the security container closure and the security housing and spaced from the combination lock and comprising;
  - a sensor for indicating if the closure is open or closed;
  - an audible alarm;
  - a first input device configured for activation by a user when the audible alarm is activated to temporarily pause or alter the audible alarm for a defined period of time; and
  - a fastener for operably, non-permanently, and removably securing the first monitor portion to the outside if the GSA approved security container; and
- wherein the audible alarm activates when the sensor of the first monitor assembly indicates that the closure is in the open position after a defined period of time.

14. The monitor for a GSA approved security container according to claim 13, further comprising a second monitor portion configured for non-permanent and removable attachment to the other one of the security container closure and the security container housing outside the security container closure and the security housing and spaced from the combination lock and juxtaposed the sensor of the first monitor portion when the security container closure is in the closed position and comprising a fastener for operably, non-permanently, and removably securing the second monitor portion to the GSA approved security container.

15. The monitor for a GSA approved security container according to claim 13, wherein the first monitor portion further includes a first visual output device configured to indicate when the first input device has been activated.

16. The monitor for a GSA approved security container according to claim 13, wherein the first monitor portion further includes a clock for providing a current date and time, a data logger configured to log the date and time of at least the last two instances when the sensor of the first monitor assembly indicated that the closure was in the open position.

17. The monitor for a GSA approved security container according to claim 16, wherein the first monitor portion further includes a digital display that displays the date and time of at least the last two instances when the sensor of the first monitor assembly indicated that the closure was in the open position.

18. A monitor for a security container, the security container having a housing forming an interior space, a closure movable between a closed position blocking access to the interior space and an open position allowing access to the interior space, and a combination lock for selectively locking the closure in the closed position and having a spinning dial for entering a combination to unlock the combination lock, the monitor comprising:

- a first monitor portion configured for attachment to one of the security container closure and the security container housing and comprising;
  - a sensor;
  - an audible alarm;
  - a clock for providing a current date and time;
  - a data logger; and
  - a fastener for operably and removably securing the first monitor portion to the security container;
- wherein the audible alarm activates when the sensor of the first monitor assembly is not juxtaposed the second monitor portion after a defined period of time; and
- wherein the data logger of the first monitor portion is configured to log the date and time of at least the last two instances when the sensor of the first monitor assembly is not juxtaposed the second monitor portion, and
- wherein the first monitor portion further includes a digital display that displays the date and time of the last two instances when the sensor of the first monitor assembly is not juxtaposed the second monitor portion indicated the closure was in the open position.

19. The monitor for a security container according to claim 18, further comprising a second monitor portion configured for attachment to the other one of the security container closure and the security container housing and juxtaposed the sensor of the first monitor portion when the security container closure is in the closed position and comprising a fastener for operably and removably securing the second monitor portion to the security container.

* * * * *